H. E. COBLE.
HEADLIGHT CONTROL DEVICE.
APPLICATION FILED SEPT. 18, 1916.
1,237,617.
Patented Aug. 21, 1917.
2 SHEETS—SHEET 2.
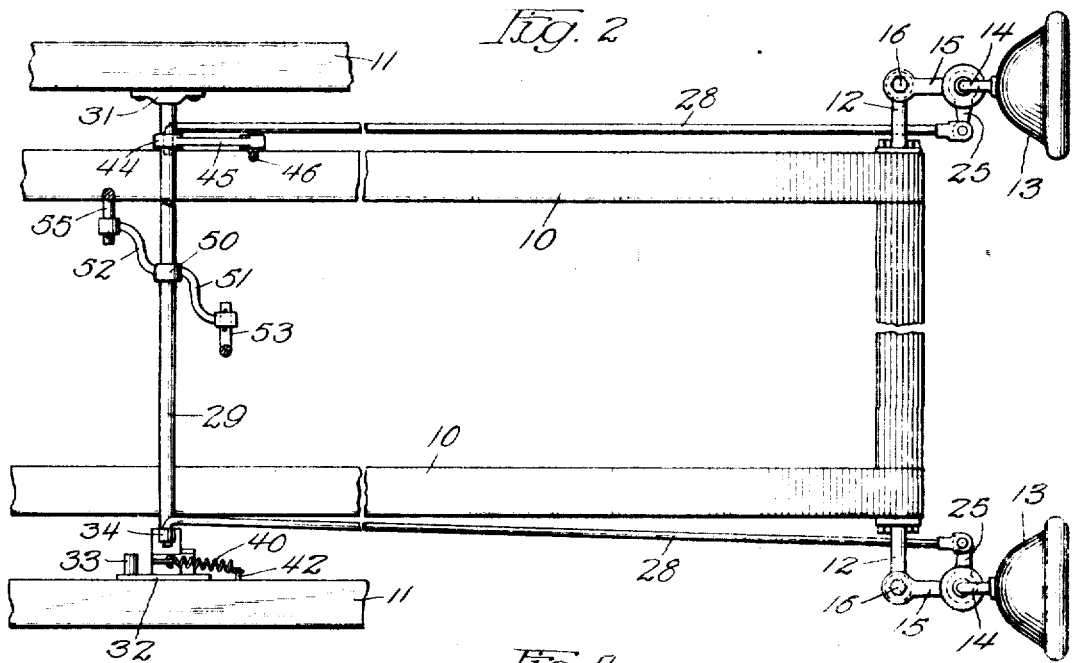
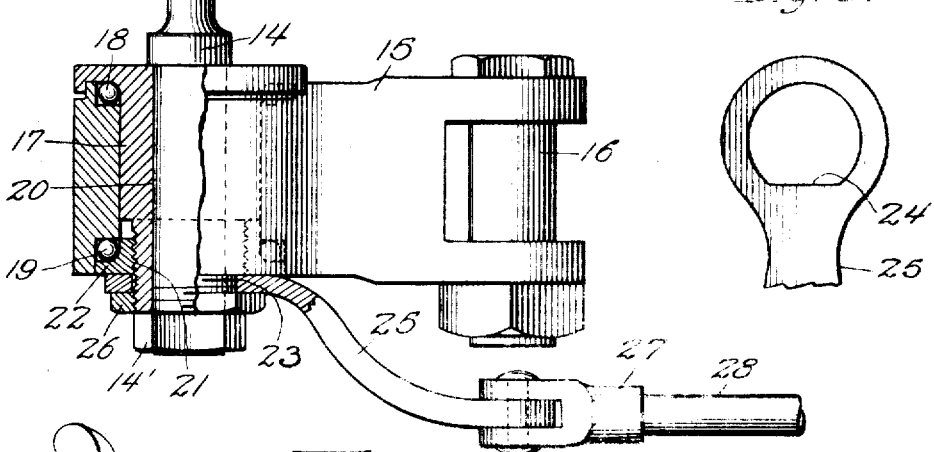

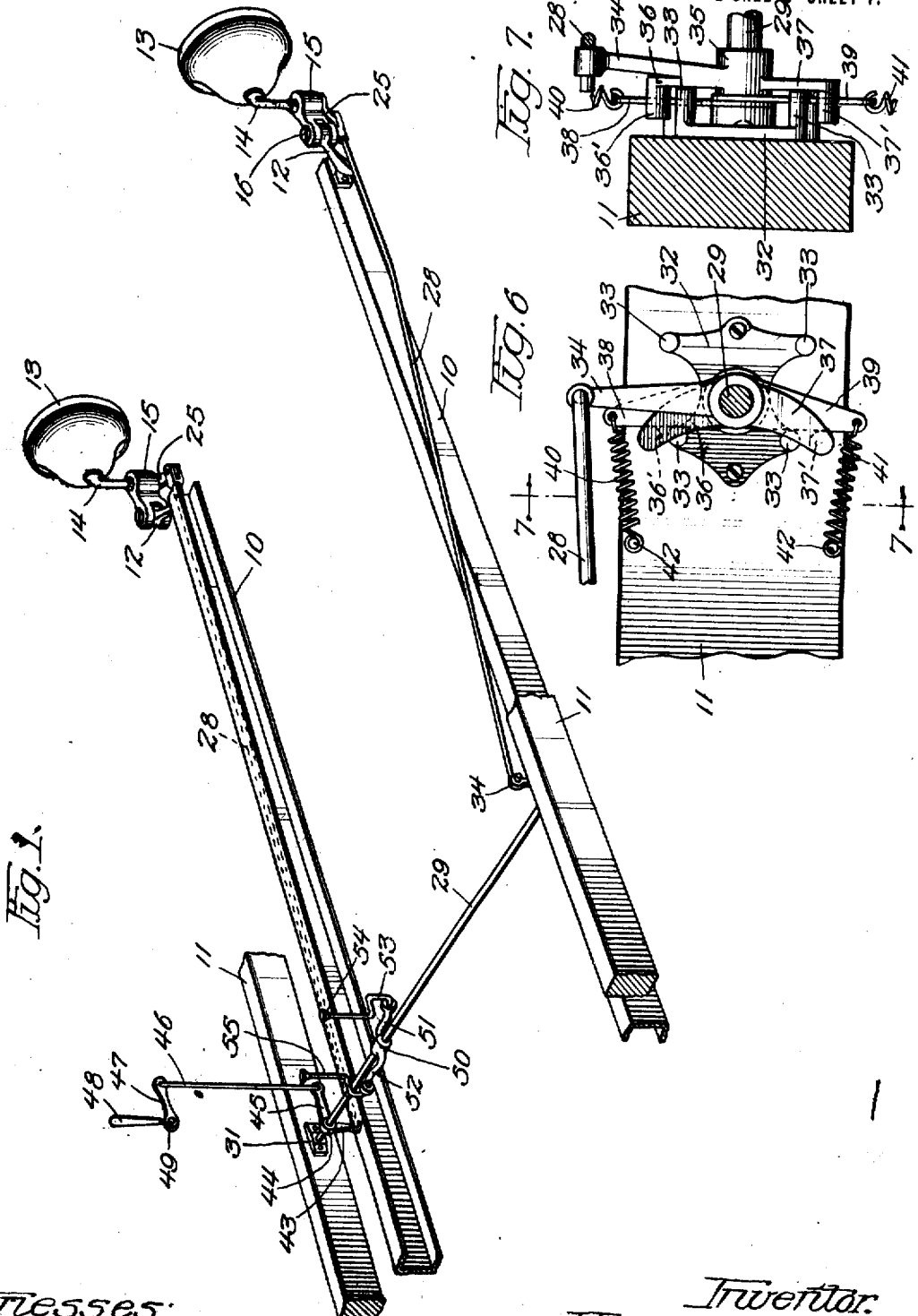

UNITED STATES PATENT OFFICE.

HARVEY E. COBLE, OF BENTON HARBOR, MICHIGAN.

HEADLIGHT-CONTROL DEVICE.

1,237,617.   Specification of Letters Patent.   Patented Aug. 21, 1917.

Application filed September 18, 1916. Serial No. 120,866.

*To all whom it may concern:*

Be it known that I, HARVEY E. COBLE, a citizen of the United States, residing at Benton Harbor, in the county of Berrien and State of Michigan, have invented certain new and useful Improvements in Headlight-Control Devices, of which the following is a specification.

This invention relates to improvements in apparatus for controlling automobile headlights and more particularly to a manually operable device whereby the driver of a car may deflect both headlights simultaneously to one side or the other, whenever he sees fit.

One of the objects of my invention is to improve that class of headlight control devices having no connection whatever with the steering apparatus of the vehicle, the headlights being entirely under the control of the driver and operable either by foot or hand power. An advantage incident to this class of devices is that the operator may deflect the light to one side or the other of the road on approaching a curve before he has reached the intersection of the road, whereas with the steering gear control the lamps are deflected only after the turning movement has been commenced. Similarly, on approaching another vehicle, the operator may deflect his lamps to the right eliminating the danger of dazzling the approaching driver and at the same time illuminating the right hand side of the roadway.

Another object of this invention is the provision of the dual control, whereby the operator may use either his heel to depress a button or a hand for moving a lever, whichever may, at the particular instant, be the most convenient, for swinging the lights to one side or the other, and the removal of his hand or his foot from the operating mechanism permits the lights automatically to be returned to their normal or "straight-ahead" position.

Another object of my invention is the provision of an apparatus which may be quickly and easily attached to a Ford car, without altering the present equipment, though the device may obviously be adapted for attachment to any type of vehicle. The only tools necessary for the installation of my apparatus on a Ford car are a screw driver and a wrench, it being unnecessary to drill or alter any of the metal parts of the machine as it is furnished by the manufacturer.

Still other and further objects of my invention will become readily apparent to those skilled in the art from a consideration of the following specification and drawings, wherein:

Figure 1 is a perspective view of a portion of the frame of a Ford automobile showing my improved apparatus installed thereon.

Fig. 2 is a plan view of the apparatus shown in Fig. 1.

Fig. 3 is a longitudinal vertical sectional view through the front compartment of a Ford showing the arrangement of foot buttons, transverse shaft and hand lever.

Fig. 4 is an elevation of the lamp bracket, with parts broken away.

Fig. 5 is a fragmentary plan view of the link connection between the operating rod and the lamp post.

Fig. 6 is a transverse sectional view through the operating shaft showing the lamp movement limiting stops and device for centering the lamp and Fig. 7 is a vertical sectional view on the line 7—7 of Fig. 6.

In the drawings I have illustrated diagrammatically the side frame members 10—10 of a Ford car with the wooden sills 11—11 upon which the body is supported. Lamp carrying arms 12—12 project outwardly from the forward ends of the frame members 10, this arm in the Ford car also forming a part of one of the fender braces. The lamps 13 are provided with vertical posts or lamp-carrying brackets 14 which normally rest within the fixed sockets in the ends of the arms 12, but for the purpose of providing a pivotal movement for the lamps I remove the lamp brackets 14 from the sockets in the arms 12 and attach a forwardly extending yoke or connecting member 15 to the arm 12 by means of bolt 16 which fits in the fixed socket usually occupied by the lamp bracket 14. This connecting member projects forwardly from the arm 12 and is provided at its front end with a thimble or socket 17, rotatably mounted within the forward end of the connecting member on a pair of ball bearings 18, 19. The central opening 20 of the socket is shaped to receive the lamp bracket 14, the nut 14' clamping it in place. The lower end of the socket 17 is threaded, as at 21, for engagement with the lower adjustable ball raceway 22 and is flattened at one side 23 for engagement with the flattened edge 24 of the opening in the lamp swinging arm 25, which fits over the lower threaded end of the cone and is locked in position by the nut 26. The lamp moving arm 25 extends inwardly toward the frame, as illustrated in Fig. 2, and connects with a yoke 27, threaded on the forward end of a rod 28. The heretofore described parts are, of course, supplied in duplicate, one being provided for each of the head lights, the two rods 28 extending rearwardly for manual operation by the driver. The rods are so bent as to clear the fenders and frame sills 10 of the car and at their rear ends engage with levers mounted on opposite sides of the transversely positioned control shaft 29.

The control shaft 29 extends from side to side of the wooden sills 11 at a point two or three inches in advance of the rear edge of the foot board or flooring 30 of the driver's compartment. At its left hand side (looking forward in the direction of car motion) the shaft 29 is journaled in a bearing 31, screwed to the inner face of the wooden sill 11. At its opposite end it is journaled in a bearing 32 screwed to the inner face of the opposite sill. This latter bearing is flattened out at its base and carries four lamp movement limiting stops 33, which project inwardly from the sill. The right hand control rod 28 is connected with an upstanding lever 34 carried by a collar 35 which is secured to the right hand end portion of shaft 29 and is also provided with a pair of upwardly and downwardly extending arms 36, 37, each of which at its end carries an outwardly projecting lug 36' and 37' for engagement with the upwardly and downwardly extending levers 38, 39, rotatable on the shaft and lying within the plane of the stops 33. Coil springs 40, 41 are connected to the outer end of each of the levers 38, 39 and at their opposite ends secured to pins 42, screwed into the wooden sill 11.

The arms 38, 39 are normally maintained by the springs 41, 42, in tight contact with the inwardly projecting lugs 36', 37', thus maintaining the headlights in their central position, the parts being in the position illustrated in Fig. 6. On rotation of the shaft in a clockwise direction (looking at Fig. 6) the upper lug 36' will move the upper arm 38 to the right tensioning the spring 40, which on the release of the shaft will bring it back to its neutral position. Rotation of the shaft 29 in counter-clockwise direction will actuate the arm 39 and the spring 41 without affecting the arm 38 or its coöperating spring 40. Maintenance of the lights in their central, "straight-ahead", position is thus insured as soon as the driver releases either the push buttons or hand control lever.

The left hand control rod 28 extends rearwardly to a downwardly extending arm 43 of a bell crank lever 44 secured to the transverse shaft 29, the other arm 45 of the bell crank extending forwardly and connected at its end to a vertically extending link 46 projecting up the inside of the door adjacent the driver's seat and connected at its upper end with a forwardly extending arm 47 of the handle 48 pivoted at 49, to the inner face of the door.

As an optional method of operating the lamps, should both hands of the operator be engaged, I have provided a foot control comprising a bracket 50, secured to the transverse shaft 29 immediately under the position occupied by the driver and having a pair of forwardly and rearwardly extending arms 51, 52. The forwardly extending arm 51 is pivoted to the lower end of a pedal 53, the intermediate portion of which is rearwardly crooked or bent, so as to position the button 54 on the upper end of the pedal 53 in the same vertical plane as the shaft 29 a short distance in front of the rear of the floor board 30. The other pedal 55 pivoted to the arm 52 is similarly crooked, but in a forward direction, so as to position its button in the same transverse line as the button 54.

From the above, the operation of the apparatus is believed to be apparent. Pressure on the right hand button 54 rotates the shaft 29 in a counter-clockwise direction, (looking at Fig. 6) moving the right hand control rod 28 forwardly and the left hand control rod rearwardly, thus swinging the lamps simultaneously to the right. Releasing pressure on the button 54 permits the spring 41 to immediately bring the parts back to their normal neutral position. Pressure on the other push button obviously moves the lights in the opposite direction. The same results may be obtained by moving the hand lever 48 either forwardly or backwardly.

Whereas I have illustrated and described a single embodiment of my invention, it is obvious that changes or modifications may be made therein without departing from the spirit of the invention or the scope of the appended claims.

Having described my invention, what I claim is:—

1. Means for automatically returning a vehicle head lamp to neutral straight-ahead position, comprising in combination with the lamp operating shaft, oppositely extending arms freely rotatable upon the shaft, a pair of movement limiting stops for each of said arms, resilient means for normally holding each of said arms in engagement with one of its stops, and oppositely extending projections fastened to the shaft for engagement with the aforesaid arms.

2. In an apparatus for controlling the head lamp of a vehicle, the combination with the pivotally mounted lamp of a transverse shaft mounted at the rear of the position normally occupied by the driver's feet, a pair of journals fastened to the vehicle frame for supporting the ends of the shaft, manually operable means for rotating said shaft, connections between the lamp and the shaft, one of said bearings having a flattened base portion and four projecting lugs, a pair of upwardly and downwardly extending arms lying between opposite pairs of lugs and freely rotatable upon the shaft, resilient means for holding the arms against one of each pair of lugs, and upwardly and downwardly extending projections secured to the shaft and extending into the plane of the arms for engagement therewith.

In testimony whereof I hereunto set my hand in the presence of two subscribing witnesses.

HARVEY E. COBLE.

In the presence of—
 MILO D. LONG,
 FLOY L. KING.